United States Patent [19]

Marks et al.

[11] Patent Number: 5,308,452
[45] Date of Patent: May 3, 1994

[54] PHOTOPOLYMER WASHOUT FLUID SOLVENT DISTILLATION APPARATUS AND METHOD

[75] Inventors: Daniel B. Marks; Donald G. Fluchel, both of St. Louis, Mo.

[73] Assignee: Progressive Recovery, Inc., Dupo, Ill.

[21] Appl. No.: 829,752

[22] Filed: Jan. 31, 1992

[51] Int. Cl.$^5$ .................. B01D 3/10; B01D 3/42
[52] U.S. Cl. .................. 202/164; 159/47.3; 159/DIG. 16; 159/DIG. 41; 202/170; 202/205; 202/242; 203/1; 203/50; 203/91
[58] Field of Search ............. 202/83, 170, 205, 235, 202/164, 242; 203/91, 150, DIG. 18; 134/12, 109; 159/DIG. 16, 47.3, DIG. 41, 43.1; 210/177, 180

[56] References Cited

U.S. PATENT DOCUMENTS

| 1,887,490 | 11/1932 | Imhoff | 210/179 |
|---|---|---|---|
| 2,289,023 | 7/1942 | Koch | 202/170 |
| 3,506,407 | 4/1970 | Keith | 210/180 |
| 3,615,253 | 10/1971 | Warzel | 159/43.2 |
| 3,718,147 | 2/1973 | Laroche | 202/170 |
| 3,974,075 | 8/1976 | Saigh et al. | 210/86 |
| 4,184,959 | 1/1980 | Marmo | 210/179 |
| 4,204,913 | 5/1980 | Sabatka | 202/170 |
| 4,219,415 | 8/1980 | Nassef et al. | 210/32 |
| 4,315,815 | 2/1982 | Gearhart | 203/89 |
| 4,320,002 | 3/1982 | Ihara | 210/178 |
| 4,477,354 | 10/1984 | Fessler | 203/37 |
| 4,488,933 | 12/1984 | Claunch et al. | 202/83 |
| 4,508,597 | 4/1985 | Roach | 203/85 |
| 4,568,427 | 2/1986 | Danz et al. | 203/71 |
| 4,582,629 | 4/1986 | Wolf | 210/748 |
| 4,601,181 | 7/1986 | Privat | 202/83 |
| 4,655,146 | 4/1987 | Lemelson | 110/247 |
| 4,693,786 | 9/1987 | Brett et al. | 202/83 |
| 4,712,392 | 12/1987 | Hagiwara et al. | 202/170 |
| 4,715,932 | 12/1987 | Misselhorn et al. | 203/DIG. 13 |
| 4,778,605 | 10/1988 | Anthoney et al. | 210/770 |
| 4,818,405 | 4/1989 | Vroom et al. | 210/603 |
| 4,834,874 | 5/1989 | Anthoney et al. | 210/179 |
| 4,895,176 | 1/1990 | Ohtsuka et al. | 202/170 |
| 4,947,769 | 8/1990 | Whitfield | 110/259 |
| 4,995,972 | 2/1991 | Kramer et al. | 210/179 |
| 5,141,630 | 8/1992 | Grosboll et al. | 203/49 |
| 5,156,173 | 10/1992 | Keyser et al. | 202/170 |

FOREIGN PATENT DOCUMENTS 44947 2/1982 European Pat. Off. .
2022227 12/1979 United Kingdom .

Primary Examiner—Virginia Manoharan
Attorney, Agent, or Firm—Rogers, Howell & Haferkamp

[57] ABSTRACT

A waste photopolymer plate washout fluid solvent distillation apparatus includes a single enclosure enclosing a waste washout fluid container, a recovered solvent container, and a distillation unit in which waste washout is distilled by application of heat and vacuum pressure to the waste washout, and by supplying a metered supply of a surrogate solvent to the distilled waste washout as a desired solvent is distilled from the waste washout. The apparatus, by supplying the surrogate solvent to the waste washout as the desired solvent is distilled from the waste washout, enables a greater percentage of the desired solvent to be recovered from the waste washout than has been heretofore possible with prior art apparatus, and also enables the waste washout to be disposed of as a liquid.

20 Claims, 2 Drawing Sheets

PHOTOPOLYMER WASHOUT FLUID SOLVENT DISTILLATION APPARATUS AND METHOD

BACKGROUND OF THE INVENTION (1) Field of the Invention

The present invention pertains to a photopolymer washout fluid solvent distillation apparatus and method. In particular, the present invention pertains to an apparatus used in distilling and recovering a desired solvent from waste photopolymer- washout fluid and to the method of the apparatus' operation. The apparatus adds a surrogate solvent to the photopolymer waste fluid as the desired solvent is distilled from the waste fluid, thereby enabling recovery of a greater percentage of the desired solvent from the waste fluid while maintaining the liquidity of the waste fluid.

(2) Description of the Related Art

Known prior art methods of producing printing plates from acrylic elastomer resins and synthetic rubber plates include photoengraving and chemical milling of plate material to produce the printing plates. In these prior art processes, a layer of photoresist is applied over a surface of the plate material. The photoresist layer is then exposed to light through a photographic film or a masking stencil having a pattern formed therein corresponding to a desired pattern to be formed on the printing plate.

Exposure of the layer of photoresist to the electromagnetic radiation through the stencil or photographic film alters the susceptibility of the photoresist layer to removal by a photopolymer plate washout fluid. Applying the photopolymer plate washout fluid to the photoresist layer and the plate material removes the resist and etches away the plate material in a reverse pattern corresponding to the stencil or photographic film. The acrylic elastomer or synthetic rubber particles etched from the plate making material are washed away with the waste photopolymer washout fluid.

In order to more efficiently produce printing plates according to the process described above, it is desirable to recover the solvent employed as the photopolymer plate washout fluid by removing the acrylic elastomer particles and other foreign particles from the washout fluid. Until recently, a dominant washout fluid used in the plate making industry was alcohol-perchloroethylene. Older solvent distillation units, designed and installed without a vacuum assist, could recover and recycle these low boiling point "perc" solvents. New regulations, however, have led washout solution suppliers to develop new "safe solvents". These high-boiling point solvents require a vacuum assist distillation system in order to recover the solvents, and almost all prior art recovery systems cannot be adapted for vacuum assist.

In addition, most prior art solvent recovery distillation systems have small capacities that are unable to service larger plate processors that produce wider plates and a greater amount of waste washout fluid. In these prior art distillation systems, a flexible bag is typically suspended inside a distillation tank. The waste photopolymer washout fluid is then supplied into the bag and the desired solvent is distilled from the washout fluid while it is in the bag. The washout fluid is distilled until it is reduced to an amorphous solid. When the distillation process reaches this point, the bag containing the amorphous solid is removed from the distillation tank and disposed of. In this prior art method of distilling desired solvents from waste photopolymer washout fluids, it is possible to recover about 85% of the desired solvent from a sample of waste washout fluid. Because the bags containing the reduced amorphous solid waste are removed from the distillation tank interior by the operator of the apparatus, the capacities of the system must be kept small to enable the bag containing the amorphous solid to be removed from the tank interior.

What is needed to overcome disadvantages associated with prior art photopolymer waste washout fluid recovery systems is a photopolymer waste fluid distillation system that is capable of processing large amounts of waste fluid and recovering more than 85% of the desired solvent from the waste fluid, while facilitating the disposal of the waste residue left after the desired solvent has been recovered. The distillation system should reduce emissions from the waste fluid processed and reduce the incidence of operator contact with the waste fluid being processed. What is also needed is a desired solvent recovery apparatus that is constructed in a manner that enables it to be easily connected with existing plate processors of various types to receive waste photopolymer washout fluid from the existing plate processor equipment and return recovered solvent to the equipment.

SUMMARY OF THE INVENTION

The photopolymer washout fluid solvent distillation apparatus of the present invention overcomes disadvantages found in solvent distillation systems of the prior art by providing an apparatus that is completely enclosed in a transportable enclosure having a Class 1, Division 2 rating, enabling the enclosure to be directly connected to existing plate making equipment without any modifications to the plate making equipment or the plate making room in which it is installed. The apparatus of the invention is capable of receiving waste photopolymer washout fluid directly from a plate processor on a continuous basis, recovering the desired solvent from the waste washout fluid, and supplying the recovered solvent directly back to the plate processor. The solvent distillation apparatus of the present invention distills a desired solvent from waste photopolymer washout fluid by a novel method that recovers a substantially greater percentage of the desired solvent from waste washout fluid than has been heretofore possible with prior art distillation systems.

The photopolymer washout fluid solvent distillation apparatus of the present invention is generally comprised of a waste washout fluid storage container that receives waste fluid directly from a plate processor, a distillation tank that is supplied with waste fluid from the waste fluid storage container, a distilled solvent container that receives distilled solvent from the distillation tank, a washout residue container that receives from the distillation tank the washout residue separated from the desired solvent, a surrogate solvent container that supplies a surrogate solvent to the distillation tank to replace the desired solvent distilled from waste washout during the distillation process, a plurality of valves and pumps that interconnect and control communication between the component parts of the invention, a control panel that enables an operator of the apparatus to control the solvent distillation process performed by the apparatus, and numerous sensors and controllers that provide for safe operations of the apparatus.

Each of the component parts of the invention described above are contained in a single cabinet enclosure that is transportable. The transportable cabinet enclosure enables the apparatus of the invention to be easily positioned relative to an existing plate processor in a plate making room. The apparatus of the invention is connected in communication with the plate processor by fluid conduits conducting waste washout fluid from the processor to the apparatus, and fluid conduits conducting distilled desired solvent from the apparatus back to the plate processor.

The apparatus of the invention distills a desired solvent blend from photopolymer waste washout fluid supplied to the distillation tank, and draws the distilled desired solvent blend to the desired solvent container of the apparatus where it is stored for continues reuse in the plate processor. As the apparatus of the invention distills the desired solvent blend from the waste washout fluid, the apparatus supplies a surrogate solvent to the distillation tank. The surrogate solvent replaces the desired solvent distilled from the waste washout fluid. The surrogate solvent has a higher boiling point temperature than the desired solvent and maintains the liquidity of the waste washout fluid as the desired solvent blend is separated from the washout fluid. This enables the apparatus of the invention to recover a greater percentage of desired solvent from a sample of waste washout fluid than has been possible by prior art methods of recovery, and also enables the apparatus to discharge a liquid waste after the desired solvent has been recovered.

The distillation tank of the apparatus is supported above a washout fluid residue container enabling the washout fluid residue left after the distillation of the desired solvent blend, and the surrogate solvent diluting the residue, to be drained by gravitation from the distillation tank directly into the residue container. The residue container is separable from the apparatus of the invention, facilitating the disposal of the washout fluid residue diluted with the surrogate solvent.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

Figure 1:
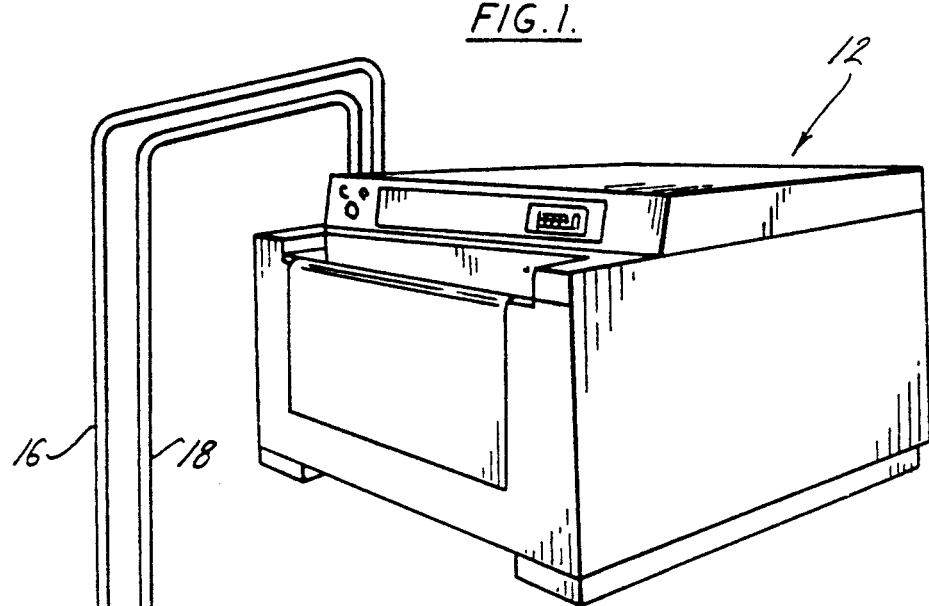
FIG. 1 is a perspective view of the apparatus of the invention connected in fluid communication with a typical plate processor.
Figure 1:
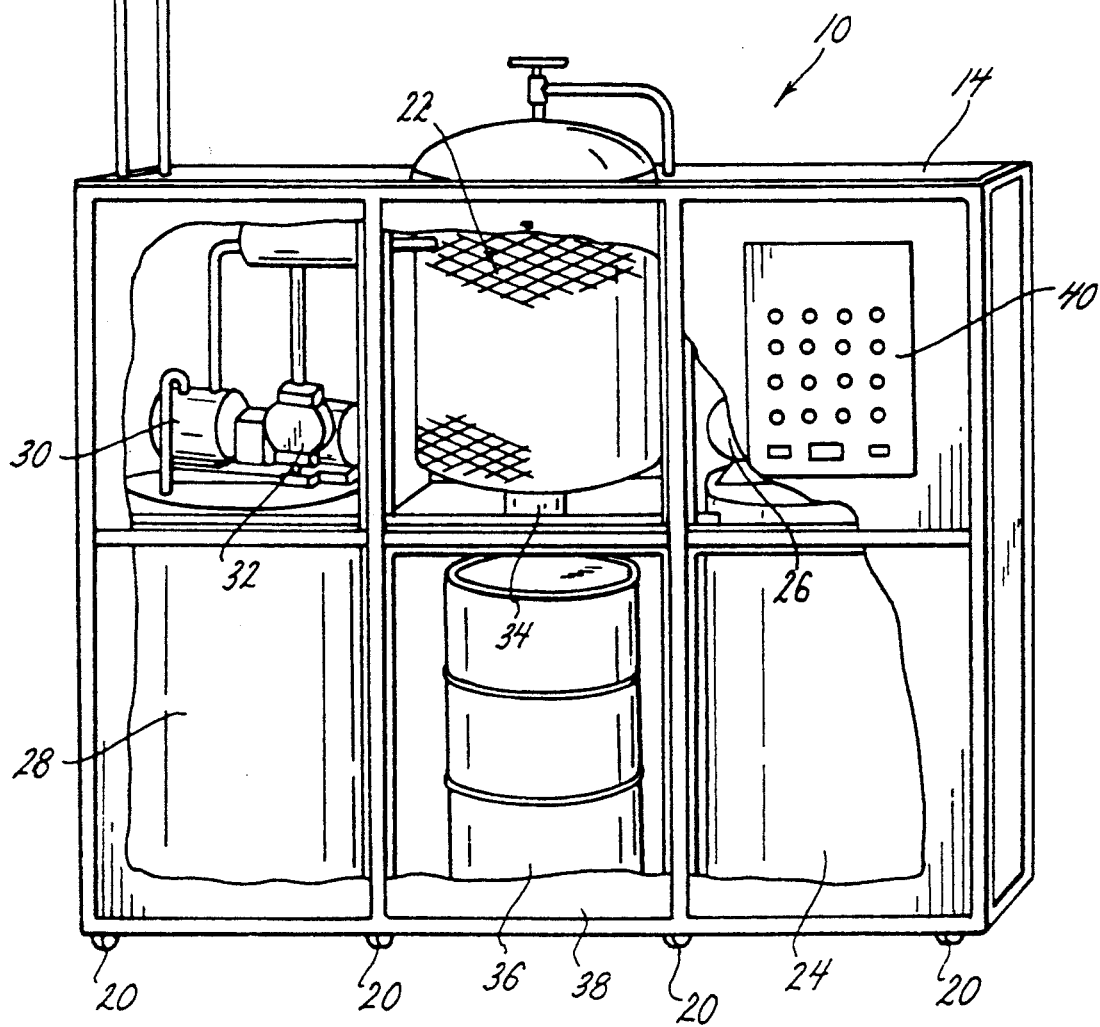

FIG. 1 of the drawing figures shows the photopolymer washout fluid solvent distillation apparatus 10 of the present invention connected in operative communication with a conventional plate processor 12. As seen in FIG. 1, the apparatus 10 is comprised of several component parts that are all contained in an enclosure cabinet 14. The component parts of the apparatus are connected in operative fluid communication with the plate processor 12 through a washout fluid conduit 16 supplying waste washout fluid from the processor 12 to the apparatus 10, and a distilled solvent conduit 18 supplying solvent distilled from the washout fluid by the apparatus back to the plate processor 12. There are other piping and utility connections to the apparatus 10 that are not shown in FIG. 1. These connections are shown and later described with reference to FIG. 2. The cabinet enclosure 14 is supported on a plurality of casters 20 that enable the apparatus 10 to be transported and easily positioned relative to an existing plate processor.

The general arrangement of the component parts of the invention in the cabinet enclosure 14 is shown in FIG. 1. These component parts include a distillation unit 22, a waste photopolymer washout fluid storage container 24, a washout fluid pump 26, a distilled solvent storage container 28, a distilled solvent vacuum pump 30, a distilled solvent supply pump 32, a residue drain 34, a residue drum container 36, a residue drum access door 38, and an apparatus main control panel 40.

As seen in FIG. 1, all of the component parts of the apparatus of the invention listed above are contained in the single cabinet enclosure 14 including additional component parts of the apparatus that are not visible in FIG. 1 but are later described with reference to the schematic of the apparatus shown in FIG. 2. The cabinet enclosure is a Class 1, Division 2 enclosure that can be located in the plate making room containing the plate processor 12 and requires no modifications or changes to the plate making room. The cabinet is easily moved to a desired location by the plurality of casters 20 provided on the cabinet. The casters 20 also serve to elevate the bottom of the cabinet and permit air flow beneath the cabinet side walls and into the cabinet interior as gases collected in the cabinet interior are exhausted from the cabinet and the plate making room by an exhaust fan (not shown in FIG. 1). The residue drum access door 38 on the front side wall of the cabinet provides access to the residue drum container 36 contained in the cabinet to periodically remove the drum and dispose of washout residue collected in the drum over a period of operation of the apparatus.

Figure 2:
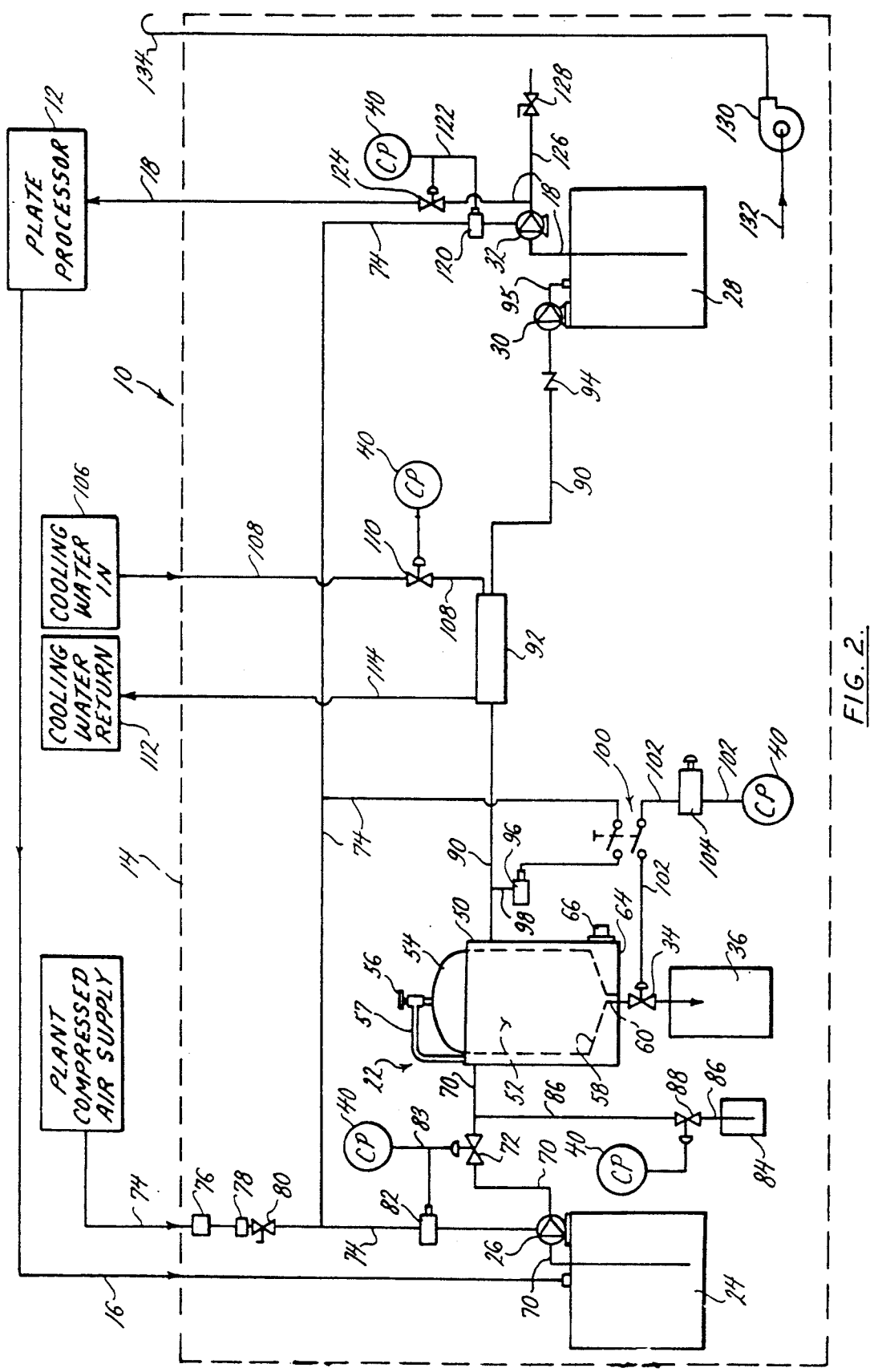
FIG. 2 is a schematic representation of the component parts that make up the apparatus of the invention and their interconnections with each other.

FIG. 2 shows a schematic representation of the component parts of the apparatus of the invention contained in the single cabinet enclosure 14. In FIG. 2 the cabinet enclosure 14 is represented by the dashed line surrounding the component parts of the apparatus.

The distillation unit 22 is comprised of a sealable tank container 50 having an interior 52 accessible through a removable lid 54 at the top of the tank. The lid 54 is secured in sealed engagement enclosing the tank interior 52 by manually adjustable threaded fastener assemblies (not shown) located around the perimeter of the tank lid. The fastener assemblies secure the tank lid 54 on the tank 50 and seal the interior of the tank 52. A center speed ball handle 56 lifts the lid 54 from the tank 50, with the fasteners disconnected, and swings away from the open top of the tank on a davit arm 57. The bottom wall of the tank 58 is tapered toward a drain conduit 60 at the center of the tank bottom wall. The tank drain conduit 60 communicates through the pneumatically controlled residue drain valve 34 with the residue drum container 36 positioned below the tank 50. By supporting the tank above the residue drum container 36 as shown in FIGS. 1 and 2, residue can be drained from the tank 50 to the drum container 36 solely by gravitation, eliminating the need for a pump.

A heating assembly heats the tank container 50 and the contents of the tank interior 52. The heating assembly includes an oil filled jacket 64 that substantially surrounds the exterior of the tank 50. An electric heater 66 is mounted to the exterior of the oil filled jacket 64 and heats the oil contained in the jacket. As the temperature of the oil contained in the jacket is increased by the heater 66, the tank container 50 and the material contained in the tank interior 52 are heated by conduction. Other equivalent heating assemblies may be employed with the apparatus of the invention other than the oil filled jacket shown.

The waste washout fluid storage container 24 receives and stores waste washout fluid from the plate processor 12 through the washout fluid supply conduit 16. The interior of the waste washout fluid storage container 24 communicates with the tank interior 52 through a supply conduit 70 communicating the washout tank 24 with the washout fluid pump 26 and a pneumatically controlled valve 72.

The washout fluid pump 26 is a pneumatic feed pump that is supplied with plant compressed air from a source exterior to the apparatus 10 through a compressed air supply line 74. The compressed air supply line 74 supplies compressed air to the pump 26 from the external source through an air filter and pressure regulator 76, a line lubricator 78, an emergency stop valve 80, and an auto pilot valve 82.

The auto pilot valve 82 controls the supply of compressed air through the compressed air supply line 72 to the pneumatic feed pump 26 in response to the pneumatically controlled valve 72 being opened. Operation of the pneumatic feed pump 26 draws photopolymer plate washout fluid from the washout fluid storage container 24 and supplies the washout fluid through the supply conduit 70 and the pneumatically controlled valve 72 to the distillation tank interior 52. The feed pump 26 may be eliminated from the apparatus 10 when the vacuum pressure created in the tank 50, in a manner yet to be explained, is sufficient to draw washout fluid from the storage container 24 and through the conduit 70 to the tank.

Pneumatic pressure is supplied through a pressure conduit 83 to the auto pilot valve 82 and the pneumatically controlled valve 72 in response to a control command signal generated at the main control panel 40 by control logic of the apparatus. The auto pilot valve 82, the pneumatically controlled valve 72 and their operative connection to the main control panel 40 of the apparatus are conventional and are not described in detail for the purpose of simplifying the description of the invention. Alternatively, solenoid controlled valves may be substituted for the pneumatically controlled valves of the apparatus. The solenoid controlled valves being operatively connected with the main control panel 40 and being opened and closed in response to command signals generated by control logic of the apparatus.

A surrogate solvent container 84 containing a surrogate solvent described later is also provided in the cabinet enclosure 14 of the apparatus 10. The surrogate solvent container 84, like the residue drum container 36, is removable from the cabinet enclosure 14 in the preferred embodiment of the apparatus. However, the solvent container may be fixed inside the enclosure. The solvent container 84 is removed from the enclosure 14 when empty in order to refill the solvent container 84 with the surrogate solvent, and is then reinserted into its operative position inside the cabinet enclosure 14. The surrogate solvent container 84 is connected in fluid communication with the washout fluid supply conduit 70 through a solvent supply conduit 86 and a pneumatically controlled valve 88 provided in the solvent supply conduit 86. The control valve 88 is also selectively opened and closed in response to control commands generated by control logic of the apparatus.

A distillate evacuation conduit 90 communicates with the tank interior 52 and extends from the tank interior through a condenser 92 and a check valve 94 to the distilled solvent vacuum pump 30. A vacuum pressure auto pilot valve 96 communicates with the distillate conduit 90 through a length of conduit 98. The auto pilot valve 96 is closed when compressed air supplied by the compressed air supply line 74 is supplied to the valve. A push button assembly 100 selectively connects the vacuum pressure auto pilot valve 96 to the compressed air supply line 74 to close the valve, and interrupts communication of the vacuum pressure auto pilot valve 96 with the compressed air in the compressed air supply line 74 to open the valve. The push button 100 is mechanically connected (not shown) with the door 38 of the apparatus cabinet enclosure 14. When the door 38 is opened, the push button 100 is opened and the supply of compressed air to the vacuum pressure auto pilot valve 96 is interrupted. The interruption in the supply of compressed air to the auto pilot valve 96 causes the valve to open and interrupts or vents the distillate conduit 90 to the atmosphere of the enclosure interior. When the door is closed the push button 100 closes causing the compressed air in the supply line 74 to be supplied to the auto pilot valve 96 and causing the valve to close, thereby reestablishing vacuum pressure in the distillate conduit 90.

The push button 100 interconnected with the cabinet enclosure door 38 also controls communication through a pneumatic pressure conduit 102 between the pneumatically controlled residue drain valve 34 and a door closed limit switch 104. The limit switch 104 in turn controls communication between the pneumatically controlled residue drain valve 34 and pneumatic pressure supplied to the pressure conduit 102 in response to a control command signal generated at the control panel 40 by the apparatus control logic. As stated earlier, the manner in which pneumatic pressure is supplied to the pneumatic pressure conduit 102 in response to a control command signal generated by the apparatus control logic is conventional and is not described in detail for the purposes of simplifying the description of the apparatus. The door closed limit switch 104 operates as a back up to the push button 100 and, like the push button, establishes communication of pneumatic pressure through the pneumatic pressure conduit 102 in response to the door 38 of the cabinet enclosure 14 being closed, and interrupts communication through the pneumatic pressure conduit 102 in response to the door 38 being opened.

The condenser 92 provided along the distillate conduit 90 is supplied with cooling water from a source 106 external to the apparatus 10. The cooling water is supplied by the source 106 through a fluid conduit 108 extending between the source and the condenser 92. The supply of water through the conduit 108 is controlled by a pneumatically controlled valve 110 that opens and closes in response to pneumatic pressure signals supplied to the valve, the pressure signals being controlled by the control logic of the apparatus. The cooling water passes through the condenser 92 to condense distillate traveling through the distillate conduit 90, and is returned to a cooling water return 112 external to the apparatus through a return fluid conduit 114 communicating the outlet of the condenser 92 with the cooling water return 112.

The check valve 94 provided in the distillate conduit 90 ensures that fluid flow progresses in only one direction through the distillate conduit. In drawing FIG. 2, the check valve 94 is positioned in the distillate conduit 90 to ensure that distillate flows through the conduit from left to right as viewed in the drawing figure.

The distilled solvent vacuum pump 30 provided in the distillate conduit 90 creates a vacuum pressure in the conduit. The vacuum pressure draws distilled solvent from the interior 52 of the distillation tank 50, through the distillate conduit 90 and the condenser 92, and the vacuum pump 30 supplies the distilled solvent through a short length of conduit 95 to the interior of the distilled solvent storage container 28.

The distilled solvent supply conduit 18 communicates the interior of the distilled solvent storage tank 28 with the plate processor 12 exterior to the apparatus 10. The distilled solvent supply pump 32 is provided in the distilled solvent conduit 18 to draw the distilled solvent from the interior of the storage container 28 and supply the solvent to the plate processor 12. The supply pump 32 is a pneumatic feed pump that is driven by plant compressed air supplied through the compressed air supply line 74 of the apparatus.

The supply of compressed air to the pump 32 is controlled by an auto pilot valve 120 interposed in the compressed air supply line 74 leading to the pump. The auto pilot valve 120 is selectively opened to supply compressed air to drive the pump 32, and closed to interrupt the compressed air supply to the pump. The auto pilot valve is opened and closed in response to pneumatic pressure signals supplied to the pilot valve through the conduit 122. The pneumatic pressure signals supplied through the conduit 122 to operate the auto pilot valve 120 are controlled in response to command signals generated by control logic of the apparatus 10. The pneumatic pressure control signals also selectively open and close a pneumatically controlled valve 124 interposed in the distilled solvent supply conduit 18 downstream of the distilled solvent supply pump 32. The control valve 124 is opened to allow distilled solvent to be pumped through the conduit 18 to the plate processor 12 by the supply pump 32. The valve 124 is closed to interrupt the supply of distilled solvent through the conduit 18. Both the control valve 124 and the auto pilot valve 120 are opened and closed simultaneously in response to pneumatic pressure signals supplied to the valves through the pressure conduit 122.

A sampling conduit 126 branches off from the distilled solvent supply conduit 18. A manually controlled valve 128 is provided toward the end of the sampling conduit 126. Manually opening the valve 128 enables a sample of the distilled solvent to be drawn off from the distilled solvent supply conduit 18. Manually closing the valve 128 interrupts the flow of distilled solvent through the sampling conduit.

An exhaust fan 130 is provided in the cabinet enclosure 14 interior. The exhaust fan has a suction hose 132 connected to a vacuum inlet of the fan 130, and an exhaust hose 134 connected to an outlet of the fan. The exhaust hose extends to a safe area outside the cabinet and the plate making room in which the apparatus is employed. The exhaust fan 130 draws any gases that may collect inside the cabinet enclosure 14 in through the suction hose 132, and exhausts the collected gases through the exhaust hose 134 to the safe area exterior to the cabinet enclosure. By providing the exhaust fan 130 and the suction and exhaust hoses 132, 134 with the cabinet enclosure 14, the cabinet enclosure qualifies as a Class 1, Division 2 enclosure and no special rooms or areas are needed to be constructed or modified to house the apparatus of the invention. This enables the apparatus of the invention to be housed in the plate making room itself with no changes being required of the plate making room.

In operation of the apparatus, waste photopolymer plate washout fluid containing a solvent desired to be distilled from the fluid and recovered is supplied from the plate processor 12 through the waste washout fluid conduit 16 to the waste washout fluid container 24. The desired solvent to be distilled may be any number of commercially available agents or solvent blends, including the widely used prior art solvent blend of alcohol-perchloroethylene or "perc".

A command signal is generated by the apparatus logic at the control panel 40 causing a pneumatic pressure signal to be supplied through the pressure conduit 83 to the pneumatically controlled valve 72 and the auto pilot valve 82. The signal received by the control valve 72 and pilot valve 82 causes both valves to simultaneously open. The opening of the auto pilot valve 82 supplies the compressed air from the plant source to the washout fluid pump 26 and drives the pump. The pump 26 draws waste washout fluid from the washout fluid container 26 and supplies the waste washout fluid to the pneumatically controlled valve 72. The opened valve 72 permits the supply of waste washout fluid to travel through the fluid conduit 70 to the interior 52 of the distillation unit tank container 50.

A level probe (not shown) is provided in the tank interior 52. The level probe provides a signal to the control panel 40 when the waste washout fluid supplied to the tank interior 52 reaches a predetermined level. At this point in the operation of the apparatus, the apparatus control logic causes a pneumatic pressure signal to be sent to the pneumatically operated valve 72 causing it to close and interrupt the supply of washout fluid to the tank interior 52. The pressure signal sent to pneumatically controlled valve 72 also automatically controls the pilot valve 82 to interrupt the supply of compressed air to the washout fluid pump 26, thereby controlling the pump to cease pumping washout fluid from the washout fluid container 24.

At this point in the operation of the apparatus, the control logic of the apparatus controls the electric heater 66 to heat the oil contained in the oil filled jacket 64 surrounding the tank 50 to a desired temperature. The heated oil surrounding the tank heats the volume of waste washout fluid supplied to the tank interior 52 to its boiling point. A thermocouple (not shown) is provided in the tank interior to monitor the waste washout fluid vapor temperature in the tank interior and provide an indication of the temperature to the operator at the control panel and to the control logic of the apparatus for safety monitoring of the temperature by the control logic.

Simultaneously with the heated oil heating the washout fluid contained in the tank interior, the distilled solvent vacuum pump 30 is actuated. Operation of the vacuum pump 30 supplies vacuum pressure through the distillate conduit 90 to the interior of the tank 52. The push button 100 and the closed door limit switch 104 control the supply of vacuum pressure through the distillate conduit 90 to the interior 52 of the tank. With the door 38 of the enclosure cabinet 14 closed, the push button 100 and the limit switch 104 are both closed. Closing the push button 100 causes compressed air in the compressed air supply line 74 to be supplied to the vacuum breaker auto pilot valve 96 closing the valve. When the auto pilot valve 96 is closed, the vacuum pressure in the distillate conduit 90 is supplied to the tank interior 52. On opening the enclosure door 38, the push button 100 is opened, interrupting the supply of compressed air to the vacuum breaker auto pilot valve 96 and causing the valve to open. This vents the distillate conduit 90 to the atmosphere of the container interior and interrupts the supply of vacuum pressure through the conduit 90 to the tank interior 52. With the enclosure cabinet door 38 closed and the push button 100 and vacuum breaker auto pilot valve 96 closed, the vacuum pressure supplied by the distilled solvent vacuum pump 30 through the distillate conduit 90 is supplied to the tank interior 52. The increased temperature of the washout fluid contained in the tank interior 52 and the vacuum pressure supplied to the tank interior together cause the desired solvent contained in the waste washout fluid to vaporize. The solvent vapor distilled from the waste washout fluid is drawn through the distillate conduit 90 by the vacuum pressure created by the vacuum pump 30. The solvent vapor is drawn through the condenser 92 where the vapor is condensed into a liquid. The liquid solvent is drawn from the condenser 92 through the conduit 90, the check valve 94, and the distilled solvent vacuum pump 30 and is supplied by the vacuum pump 30 through the conduit 95 to the interior of the distilled solvent storage container 28 where the distilled solvent is collected and stored.

As the desired solvent is distilled from the waste fluid contained in the tank interior 52, the waste fluid contained in the tank interior becomes more concentrated and coalesces toward a soft, plastic, amorphous solid. To prevent the waste fluid from being completely reduced to an amorphous solid incapable of flowing out of the tank interior, a surrogate solvent contained in the surrogate solvent container 84 is added to the waste fluid contained in the tank interior 52 as it is distilled. The surrogate solvent has a higher boiling point temperature than the solvent desired to be recovered from the waste washout fluid and the desired solvent vaporizes at a lesser temperature than the surrogate solvent added to the waste washout fluid. The addition of the surrogate solvent to the waste fluid being concentrated in the tank interior by distillation maintains the liquidity of the waste fluid concentrate and enables a greater percentage of the desired solvent to be distilled from the waste fluid. The surrogate solvent may be any commercially available agent or solvent blend, with the only requirement of the surrogate solvent being that it be less expensive than the desired solvent being recovered in order to realize a pecuniary benefit from the recovery process performed by the apparatus.

In prior art distillation operations of waste photopolymer plate washout fluids to recover a desired solvent contained in the fluids, the waste washout fluid could not be distilled beyond the extent where about fifty percent (50%) of the desired solvent still remained in the concentrated waste fluid and still maintain the liquidity of the waste fluid concentrate. In the present invention, by adding the surrogate solvent to the concentrated waste fluid distilled in the tank interior 52, a greater percentage of the desired solvent can be distilled from the waste fluid while still maintaining the liquidity of the fluid. For example, by adding the surrogate solvent to the waste fluid as the desired solvent is distilled from the fluid by the apparatus of the invention, up to about 98% of the desired solvent contained in the waste fluid may be recovered while still maintaining the liquidity of the concentrated fluid diluted with the surrogate solvent supplied by the apparatus.

In the apparatus of the invention, the surrogate solvent contained in the surrogate solvent container 84 is supplied to the tank interior 52 at initiation of the distillation of the washout fluid contained in the tank interior. The pneumatically controlled valve 88 is opened to an extent controlled by the apparatus control logic to meter the supply of surrogate solvent from the solvent container 84, through the solvent conduit 86 and the supply conduit 70, to the tank interior 52. The surrogate solvent is drawn from the solvent container 84 and through the conduits 82, 70 to the tank interior 52 by the vacuum pressure present in the tank interior created by the distilled solvent vacuum pump 30. By constructing the apparatus of the invention so that the surrogate solvent is drawn into the tank interior 52 solely by the vacuum pressure present in the tank interior 52, the need for an additional pump in the conduits 86 and 70 to supply the surrogate solvent to the tank interior is eliminated.

In one illustrative example of the present invention, the solvent OPTISOL, a trade designation of the DuPont Company, is employed in the plate processor to dissolve portions of a synthetic polymeric resin plate exposed to light in a photopolymer plate making process. The plate making process that takes place in the plate processor 12 is conventional, is not a part of the present invention, and therefore is not described in detail. The washout fluid received by the apparatus of the invention from the plate processor 12 contains a mixture of the solvent OPTISOL and photopolymer solids consisting of acrylic elastomer resins and synthetic rubber. The photopolymer solids are soluble in the OPTISOL solvent to the extent of 15–20% by weight. As the OPTISOL solvent is distilled from the waste fluid received by the apparatus, the weight percent of the photopolymer solids relative to the OPTISOL solvent in the waste fluid increases to greater than 20% by weight. At this point, the OPTISOL solvent is still attached to the surfaces of the acrylic elastomer particles in the waste fluid and acts as a plasticizer preventing the acrylic elastomer particles from coalescing into a non-flowable aggregate. So long as the acrylic elastomer particles in the waste fluid are separated by a minimum coating of the OPTISOL solvent plasticizer, cross linking and vulcanization of the acrylic particles is prevented. However, on continued distillation of the desired OPTISOL solvent from the waste fluid, the acrylic elastomer particles in the fluid tend to coalesce into a soft, plastic, amorphous solid.

To prevent the acrylic elastomer particles of the waste fluid from coalescing into an amorphous solid, the surrogate solvent is added to the waste fluid being distilled in the tank 50 of the apparatus. The surrogate solvent added to the waste fluid replaces the desired solvent distilled from the waste fluid and maintains the fluidity of the waste fluid. Desirable results have been obtained by adding a percentage amount of surrogate solvent to the waste fluid being distilled equivalent to the percentage of photopolymer solids contained in the waste fluid. The surrogate solvent, in a manner similar to that of the solvent being distilled from the waste fluid, coats the acrylic elastomer particles in the waste fluid and prevents their coalescing into an amorphous solid. This enables the waste fluid being distilled in the apparatus of the invention to maintain its liquidity as the desired solvent is distilled from the waste fluid. Because the surrogate solvent has a higher boiling point temperature than the desired solvent, it remains in the waste fluid as the desired solvent is distilled out. It has been found that up to 98% of the desired solvent contained in the waste fluid may be distilled from the fluid while adding the surrogate solvent to the fluid being distilled. In this manner, a significantly larger percentage of the desired solvent may be recovered from the waste fluid while maintaining the liquidity of the waste fluid than has been heretofore possible with prior art solvent recovery methods. Because the surrogate solvent added to the waste fluid is less expensive than the desired solvent distilled from the fluid, a substantial cost savings is achieved. Additional cost savings are achieved by disposing of the waste as a fluid rather than as a solid material.

As the desired solvent is continued to be distilled from the waste washout fluid contained in the tank interior 52, the vacuum pressure created by the vacuum pump 32 in the distillate conduit 90 continues to draw the distilled solvent vapor through the conduit to the condenser 92. The cooling water circulated through the condenser 92 by the water supply conduit 108 and the water return conduit 114, and controlled by the pneumatically controlled valve 110, condenses the solvent vapor to a liquid. The condensed solvent liquid then continues to flow through the distillate conduit 90 from the condenser 92 through the one way check valve 94 and the distilled solvent vacuum pump 30 and is received and stored in the distilled solvent storage container 28.

The desired solvent distilled from the waste washout fluid and stored in the distilled solvent storage container 28 is drawn through the distilled solvent conduit 18 out of the container 28 by the distilled solvent supply pump 32. The supply pump 32 supplies the distilled solvent through the solvent conduit 18 back to the plate processor 12 outside the apparatus enclosure 14. The pneumatically controlled valve 124 controls the supply of distilled solvent through the conduit 18 to the plate processor 12 in response to pneumatic pressure signals supplied to the valve 124 from the main control panel 40.

As described earlier, the supply pump 32 is a pneumatic pump that is driven by the compressed air in the compressed air supply line 74. The auto pilot valve 120 supplies compressed air to the pump 32 in response to the same pneumatic pressure signal supplied to the pneumatically controlled valve 124 from the main control panel 40. Should the control logic of the apparatus cause the pneumatic valve 124 to close by causing the supply of pneumatic pressure to the pneumatic pressure conduit 122 to be interrupted, the interruption of the pneumatic pressure will also cause the auto pilot valve 120 to close and interrupt the supply of compressed air to the pump 32 causing the pump to cease operating.

In the operation of the apparatus described above, a desired solvent contained in waste photopolymer washout fluid supplied to the distillation unit tank interior 52 from a plate processor is recovered from the waste washout fluid and recycled back to the plate processor 12. The ability of the apparatus of the invention to supply a surrogate solvent to the waste washout fluid contained in the distillation unit tank interior 52 as the desired solvent is distilled from the washout fluid enables the apparatus to withdraw a greater percentage of the desired solvent from the washout fluid while maintaining the liquidity of the washout fluid than has been heretofore possible with prior art recovery systems.

After the desired solvent has been recovered from the waste washout fluid contained in the distillation unit tank interior 52, the concentrated washout fluid diluted with the surrogate solvent is drained from the tank interior through the tank drain conduit 60 and the pneumatically controlled residue drain valve 34 to the residue drum container 36. The pneumatically controlled residue drain valve is opened in response to a pneumatic pressure signal received by the valve. The pneumatic pressure signal is supplied to the valve in response to a control command generated at the control panel 40 by the control logic of the apparatus. The pneumatic control signal is supplied from the control panel 40 through the pneumatic pressure conduit 102, the closed door limit switch 104, and the push button 100 to the pneumatically controlled residue drain valve causing the valve to open. Opening of the valve causes the fluid concentrated waste washout diluted by the surrogate solvent contained in the tank interior 52 to be drained from the tank interior into the residue drum container 36. Supporting the distillation unit tank 50 above the residue drum container 36 in the manner shown in FIGS. 1 and 2 enables the concentrated washout fluid diluted with the surrogate solvent to be drained from the tank interior 52 into the residue drum container 36 solely by gravitation. By supporting the distillation unit tank 50 in an elevated position directly above the residue drum container 36, the need for a pump to drain the tank interior is eliminated.

As explained earlier, closing the cabinet door positions the closed door limit switch 104 and the press button 100 in their closed positions enabling pneumatic pressure to flow through the pressure conduit 102 to the pneumatically controlled valve 34 opening the valve. The opening of the residue drain valve 34 permits the concentrated waste fluid diluted with the surrogate solvent contained in the tank interior 52 to drain through the tank drain conduit 60 into the residue drum container 36. When the residue drum container 36 is filled with concentrated waste fluid and surrogate solvent drained from the tank interior, the drum container may be removed from the interior of the cabinet enclosure 14 and transported from the apparatus to dispose of the waste fluid and surrogate solvent contained in the drum container. The drum container 36 is removed from the interior of the cabinet enclosure by opening the enclosure door 38 to access the container. Opening the enclosure door 38 opens the push button switch 100 and the door closed limit switch 104, interrupting the flow of compressed air to the vacuum breaker auto pilot valve 96 and the pneumatically controlled residue drain valve 34 causing the pilot valve 96 to open venting the vacuum pressure in the distillate conduit 90 and causing the residue drain valve 34 to close. This automatically prevents waste washout diluted with the second solvent from draining from the tank interior 52 and prevents additional surrogate solvent from being supplied to the tank interior by the vacuum pressure in the distillate conduit 90. Once the residue drum container 36 has been emptied and replaced in the cabinet enclosure interior, closing the enclosure door 38 closes the push button switch 100 and the door close limit switch 104 and once again enables the apparatus to operate in the manner described above.

Although the apparatus of the invention has been described as recovering a particular desired solvent from waste photopolymer plate washout fluid by employing a surrogate solvent, it should be understood that the described operation of the apparatus is illustrative only and that the apparatus may be employed in recovering different desired solvents from waste fluids by employing different surrogate solvents.

While the present invention has been described by reference to a specific embodiment, it should be understood that modifications and variations of the invention may be constructed without departing from the scope of the invention defined in the following claims.

What is claimed is:

1. An apparatus for treating waste photopolymer plate washout fluid containing a first solvent, for recovering the first solvent from the waste fluid while maintaining the fluidity of the waste fluid, the apparatus comprising:
   means for receiving and distilling the waste fluid;
   means for supplying heat to the distilling means and to the waste fluid contained in the distilling means to distill the first solvent from the waste fluid and concentrate the waste fluid;
   means for removing the first solvent distilled from the waste fluid from the distilling means; and,
   means for supplying a second solvent different from the first solvent to the concentrated waste fluid contained in the distilling means to dilute the concentrated waste fluid and maintain the fluidity of the concentrated waste fluid.

2. The apparatus of claim 1, further comprising:
   means for draining the concentrated waste fluid diluted with the second solvent from the distilling means; and,
   means for receiving and holding the concentrated waste fluid diluted with the second solvent drained from the distilling means.

3. The apparatus of claim 2, wherein:
   the distilling means is elevated over the draining means and the holding means, thereby enabling the draining means to drain concentrated waste fluid diluted with the second solvent from the distilling means to the holding means solely by gravitation.

4. The apparatus of claim 2, wherein:
   the distilling means, the heat supplying means, the first solvent removing means, the second solvent supplying means, the draining means, and the holding means are all enclosed together in a single enclosure.

5. The apparatus of claim 4, wherein:
   the single enclosure contains a means of forcibly exhausting gases contained in the enclosure out of the enclosure.

6. The apparatus of claim 4, further comprising:
   means for storing photopolymer plate waste fluid and for supplying the waste fluid to the distilling means, the waste fluid storing means being enclosed in the enclosure.

7. The apparatus of claim 4, wherein:
   the holding means is removable from the enclosure for transporting the concentrated waste fluid diluted with the second solvent received by the holding means away from the enclosure.

8. The apparatus of claim 7, wherein:
   a door is provided on the enclosure for opening and providing access into the enclosure and for closing and obstructing access into the enclosure, the door includes means for preventing the first solvent removing means from removing the first solvent distilled from the waste fluid from the distilling means in response to the door opening.

9. The apparatus of claim 1, wherein:
   the first solvent removing means also draws the second solvent from the second solvent supplying means and draws the second solvent to the distilling means.

10. The apparatus of claim 1, wherein:
    the first solvent removing means supplies a vacuum pressure to the distilling means that removes the first solvent distilled from the waste fluid from the distilling means and also draws the second solvent from the second solvent supplying means to the distilling means.

11. The apparatus of claim 1, further comprising:
    means for controlling the second solvent supply means to supply the second solvent to the distilling means at a metered rate that enables the concentrated waste fluid contained in the distilling means to remain fluid as the first solvent is distilled in the distilling means.

12. An apparatus for treating waste photopolymer plate washout fluid for recovering a first solvent from the waste fluid while maintaining the fluidity of the waste fluid, the apparatus comprising:
    a tank for receiving an distilling waste photopolymer plate washout fluid in an interior of the tank;
    a heating assembly connected with the tank for supplying heat to the tank interior and to waste fluid contained in the tank interior to distill the first solvent from the waste fluid and thereby reduce the waste fluid to a concentrate;
    a vacuum pump communicating with the tank interior for supplying vacuum pressure to the tank interior and to waste fluid contained in the tank interior to assist in distilling the first solvent from the waste fluid and thereby reduce the waste fluid to a concentrated, and to draw the first solvent out of the tank interior; and
    a container of a second solvent different from the first solvent communicating with the tank interior for supplying the second solvent to the tank interior to replace distilled first solvent drawn out of the tank interior by the vacuum pump and to dilute waste concentrate contained in the tank interior.

13. The apparatus of claim 12, wherein:
    the vacuum pump also communicates with the container of second solvent and draws the second solvent from the container to the tank interior.

14. The apparatus of claim 12, wherein:
    a drain is connected to the tank and communicates with the tank interior for selectively draining waste concentrate diluted with the second solvent from the tank interior, and a second container communicates with the drain to receive waste concentrate diluted with the second solvent drained from the tank interior by the drain.

15. The apparatus of claim 14, wherein:
    the tank is elevated over the drain and the second container, thereby enabling the drain to drain waste fluid concentrate diluted with the second solvent from the tank interior to the second container solely by gravitation.

16. The apparatus of claim 14, wherein:
    the tank, the heating assembly, the vacuum pump, the container of second solvent, and the second container are all enclosed together inside an interior of a single cabinet.

17. The apparatus of claim 16, wherein:
an exhaust blower is provided in the cabinet for forcibly exhausting gases from the cabinet interior.

18. The apparatus of claim 16, wherein:
a third container containing waste photopolymer plate washout fluid is enclosed in the cabinet interior, the third container communicates with the tank interior and supplies waste fluid to the tank interior.

19. The apparatus of claim 16, wherein: the second container is removable from the cabinet interior and is transportable away from the cabinet.

20. The apparatus of claim 19, wherein:
the cabinet has a door that is opened to access the cabinet interior and is closed to obstruct access to the cabinet interior, and a valve is provided in the cabinet and is operatively connected with the cabinet door to disrupt communication between the vacuum pump and the tank interior in response to the door opening, and to reestablish communication between the vacuum pump and the tank interior in response to the door closing.

* * * * *